United States Patent [19]
Bergamasco et al.

[11] Patent Number: 5,912,658
[45] Date of Patent: Jun. 15, 1999

[54] DEVICE OPERABLE TO SUPPLY A FORCE FEEDBACK TO A PHYSIOLOGICAL UNIT TO BE USED IN PARTICULAR AS AN ADVANCED INTERFACE FOR MACHINES AND COMPUTERS

[75] Inventors: Massimo Bergamasco, Agrano Di Omegna; Sandro Scattareggia Marchese, Messina; Fabio Salsedo, Latina; Luca Ferretti, Pontedera, all of Italy

[73] Assignee: Scuola Superiore Di Studi Universitari E Di Perfezionamento S. Anna, Pisa, Italy

[21] Appl. No.: 08/628,657

[22] PCT Filed: Oct. 6, 1994

[86] PCT No.: PCT/EP94/03311

§ 371 Date: Jun. 10, 1996

§ 102(e) Date: Jun. 10, 1996

[87] PCT Pub. No.: WO95/10396

PCT Pub. Date: Apr. 20, 1995

[30] Foreign Application Priority Data

Oct. 8, 1993 [IT] Italy .................................. B093A0397

[51] Int. Cl.⁶ ........................................................ G09G 5/00
[52] U.S. Cl. .............................. 345/156; 364/806; 414/5; 600/595
[58] Field of Search ..................................... 345/156, 188; 414/5; 364/806; 341/27; 901/34; 340/407.1; 463/37

[56] References Cited

U.S. PATENT DOCUMENTS

| 5,004,391 | 4/1991 | Burdea ........................................ 414/6 |
|---|---|---|
| 5,184,319 | 2/1993 | Kramer ..................................... 364/806 |
| 5,381,158 | 1/1995 | Takahara et al. ......................... 345/156 |
| 5,429,140 | 7/1995 | Burdea et al. ............................ 128/774 |
| 5,516,249 | 5/1996 | Brimhall ....................................... 414/5 |
| 5,583,478 | 12/1996 | Renzi ..................................... 340/467.1 |
| 5,631,861 | 5/1997 | Kramer ..................................... 364/806 |

FOREIGN PATENT DOCUMENTS

| T092941 | 11/1992 | Italy . |
|---|---|---|
| 2013617 | 8/1979 | United Kingdom . |
| 9000879 | 2/1990 | WIPO . |
| 9111775 | 8/1991 | WIPO . |
| 9412925 | 6/1994 | WIPO . |

*Primary Examiner*—Brent A. Swarthout
*Attorney, Agent, or Firm*—Sughrue, Mion, Zinn, Macpeak & Seas, PLLC

[57] ABSTRACT

A device operable to supply a force feedback to a physiological unit to be used as an advanced interface for machines and computers, including an exoskeleton which includes kinematic elements articulated about articulation axes arranged coincident with or in close proximity to the physiological axes of the physiological unit such as, for example, the flexion-extension axes of the phalanges of the fingers of a hand of an operator. A series of electrical actuators controls the degree of tension on traction cables applying a force feedback to the kinematic elements and consequently to the physiological unit, so as to simulate an interaction between the operator and a virtual object. The device includes position sensors for detecting the configuration of the physiological unit and force sensors for measuring the strength of the force locally applied thereto by the actuators controlled by a processing system.

15 Claims, 6 Drawing Sheets

DEVICE OPERABLE TO SUPPLY A FORCE FEEDBACK TO A PHYSIOLOGICAL UNIT TO BE USED IN PARTICULAR AS AN ADVANCED INTERFACE FOR MACHINES AND COMPUTERS

BACKGROUND OF THE INVENTION

The present invention relates to a device operable to supply a force feedback to a physiological unit. The invention was developed with particular attention to a device operable to detect the configuration of a distal physiological unit and to supply a force feedback thereto.

Particularly, but not exclusively, the present invention relates to an advanced interface device between a human operator and a machine or computer, of the type operable to transmit to the machine information on the configuration of a distal physiological unit of the operator and to supply at least one part of the operator's body with a force feedback sensation.

Interface devices are known which enable an operator to interact with a machine or computer by transmitting information relating to the movement and the position of the hand or fingers. This type of interface device is used increasingly frequently in applications in the field of virtual reality and/or remote operation. These terms should be understood to mean the field of those applications in which events and situations involving man's interaction with the outside world are simulated, generally with the assistance of a computer, either for training purposes (flight or driving simulators for example), design purposes (products or industrial processes, architectural or town planning environments) or other recreational, didactic or humanitarian purposes (games, study programmes, communications systems for the disabled), or in sophisticated automation applications such as the remote control of a working robot in an environment which is inaccessible or dangerous to man.

In all these applications use is generally made of interface devices which enable an operator to interact, more or less fully and realistically, with virtual objects, represented by a computer, as though he was interacting directly with real objects.

One of these devices is described in Italian Patent Application N. TO92A000941 by the same applicant.

However, the use of devices which allow only the movements and/or positions of an operator's hand and fingers to be detected is not entirely satisfactory in applications requiring a greater verisimilitude of the sensations produced during simulation, since these do not allow the operator an immediate and natural perception of the interaction with the objects, in effect of their solidity. In other words, with devices of the aforesaid type the virtual object always remains an abstract entity and the perception of interaction between man and object requires a conceptual effort on the part of the operator as, for example, the fact that the object has been gripped is visualised or indicated acoustically. A long period of training is required for an operator to be able profitably to use such an interactive system, and even after such training results may remain unsatisfactory.

It was thus felt necessary to develop interactive man-machine systems that appear more "natural", that is enable the interactive forces exerted on the operator to be as close as possible to those felt during normal gripping and manipulation of real objects. In particular, it was deemed necessary to reproduce the internal forces due to the gripping and manipulation of an object and the external forces due, for example, to its own weight.

A device of the aforesaid type is shown in International Patent Application WO 91/11775. This document describes and illustrates a device including a support in the form of a glove which can be fitted to the operator, and has position sensors for transmitting to a computer signals indicating the position of the fingers of the operator's hand, and also including a system of actuators, controlled by the computer and interacting with the tips of the fingers of the glove, operable to transmit force signals to the operator's fingers. In more in detail, the actuators include a plurality of electric motors and a series of tendons extending from the wrist, along the back and the palm of the hand and along the fingers to the finger tips. The computer controls the movement of the electric motors which, by tensing or relaxing the tendons, give a sensation of force to the operator's fingers, related to the conditions of contact with the virtual objects determined by the virtual reality program.

Such known devices involve a series of disadvantages which do not recommend their use in virtual reality applications in which the interaction between the hand and an object needs to be represented with sufficient verisimilitude. In fact, in known devices the force applied to the fingers of the operator's hand is determined by measuring the tension of the tendons. The considerable and unquantifiable friction between the tendons and the guide sheaths arranged on the support glove does not permit a measurement upstream of the transmission to be correlated sufficiently accurately with the force effectively exerted downstream of it.

In addition, the fact that the forces are exerted exclusively on the distal phalanges of the fingers does not permit correct simulation of any interactions with objects which involve other phalanges.

Finally, as devices of known type use flexible sheaths to guide the wires, which are supported by the glove and, in the final analysis, by the operator's own hand, the overall sensation is unnatural as the spurious forces necessary for the mechanical equilibrium of the sheath are added to the desired force on the operator's fingers.

All this contributes to falsifying the force sensation felt by the operator, differentiating it and distinguishing it from the natural sensations of interaction with real objects and thus meaning that a period of training and a conceptual effort are required to use known devices.

SUMMARY OF THE INVENTION

The object of the present invention is to overcome the disadvantages of the prior art and to provide a device of the aforementioned type which gives an operator a force feedback which is as similar as possible to natural interaction with real objects.

In order to achieve this object, the present invention relates to a device operable to provide a force feedback to a physiological unit, articulated about at least one physiological axis, which includes generator means for generating a force simulating an interaction between said physiological unit and a virtual object, and transmission means for transmitting said force to the physiological unit, wherein the transmission means include at least two kinematic elements, articulated about at least one articulation axis which is arranged coincident with or immediately adjacent said physiological axis.

With the device according to the present invention it is possible to exert arbitrary forces not only on the distal phalanges of the operator but on each phalanx, as well as on the palm of the hand and, more generally, on the articulated elements of a physiological unit. This device makes it possible to eliminate spurious forces (that is forces unconnected with the forces to be exerted on the phalanges of the operator) in that the force transmission support is made using rigid parts which do not lie along the operator's phalanges.

These rigid parts are articulated to each other about kinematic axes which are substantially coincident with the physiological axes of the hand, the human forearm and, more generally, of physiological units of human articulation. This makes it possible to maintain the direction of the force which can be exerted invariable with respect to the phalanx axis.

With this device, forces exerted on the phalanges of the operator are also measured locally, at the point of application, so as to maximise the accuracy of the system for measuring these forces and, consequently, that of the servosystems actuating the forces, as is better described hereinafter.

It is also possible, with this device to measure locally the relative angular positions of the articulated units constituting the exoskeleton of the fingers. As for the forces exerted, this further characteristic maximises the accuracy of the system for measuring the configuration of the exoskeleton and, ultimately, of the operator's fingers.

Another advantage of the present invention is the substantial elimination of friction in the transmission of forces from the actuators to the points of application of these forces. This characteristic provides greater stability of the force actuation system.

A further advantage of the present invention lies in the fact that it provides for compensating for kinematic errors which occur when the mechanical axes of the device and the physiological axes of human articulations do not fully and accurately coincide. This arrangement makes it possible for different operators to use the same device, at different times, as this device can adapt, without intervention or adjustment, to the different anthropometric measurements of different operators, whilst maintaining its characteristics of precision and reliability.

Another advantage of a preferred embodiment of the present invention is that it provides an interface device which is small, extends only over the back of the hand and wrist, and is easy to put on, thus simplifying fitting operations and reducing preparation times when organising virtual reality applications.

Naturally, while the device was developed with particular attention to a distal physiological unit, the underlying operating principles of the present invention may be extended and applied to the development of devices operable to provide a force feedback to any human articulation, making it possible to develop an interface structure between the entire body of an operator and a virtual reality system.

BRIEF DESCRIPTION OF THE DRAWINGS

Further advantages and characteristics of the present invention will become clear from the detailed description which follows, with reference to the appended drawings, provided purely by way of non-limitative example, in which.

DETAILED DESCRIPTION OF THE INVENTION

Figure 1:
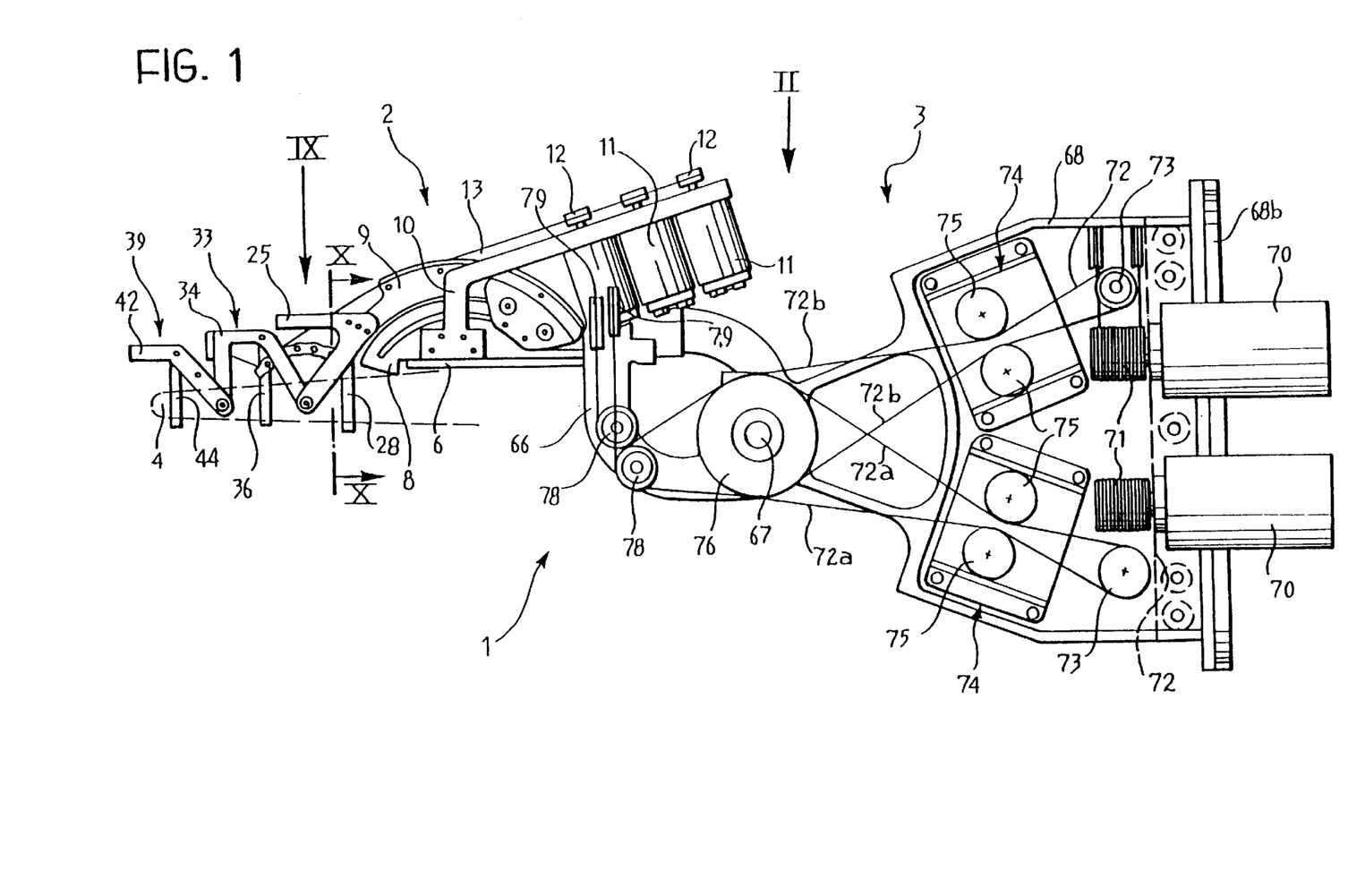
FIG. 1 is a schematic side view of an interface device according to the present invention, which can be fitted to the hand and forearm of an operator.
Figure 6:
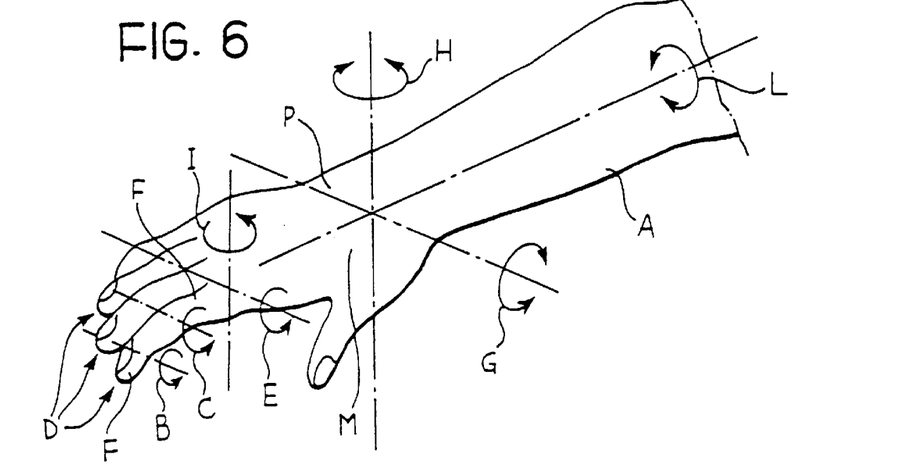
FIG. 6 is a schematic illustration of the articulated movements of the hand of an operator.

With reference now to FIG. 1, an exoskeleton which can be fitted on the hand and forearm of an operator is generally indicated 1. The exoskeleton 1 is made up of a first, exoskeleton hand portion 2 and a second, exoskeleton wrist portion 3. The exoskeleton hand 2 is associated, as better illustrated hereinafter, with a glove structure 4 which can be fitted on the hand M of an operator (see FIG. 6) and which includes a plurality of fingers D made up of phalanges F. As shown in FIG. 6, the system constituted by the hand M and forearm A of the operator, articulated to each other at a wrist P, is defined by a plurality of articulated movements, which may be schematically indicated as relative rotations of pairs of articulated elements about respective axes of rotation, indicated by the arrows of FIG. 6 which show respectively the flexion-extension movement of the distal phalanx (arrow B), the flexion-extension of the medial phalanx (arrow C), flexion-extension of the proximal phalanx (arrow E), abduction-adduction of the finger D (arrow I), flexion-extension of the wrist P (arrow G), abduction-adduction of the wrist P (arrow H) and pronation-supination of the hand M (arrow L).

Figure 3:
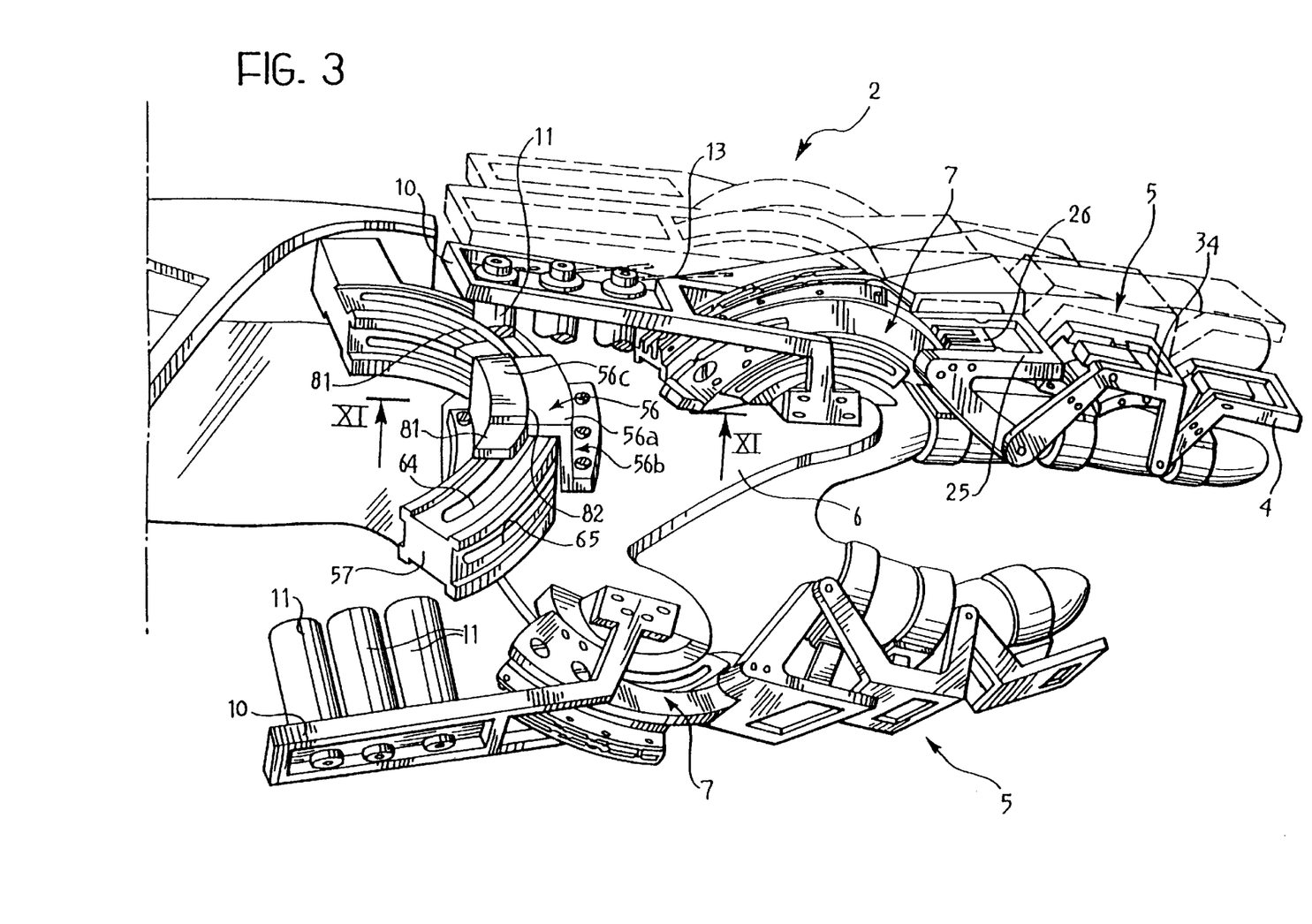
FIG. 3 is a schematic perspective view of a part of the device of FIGS. 1 and 2.
Figure 4:
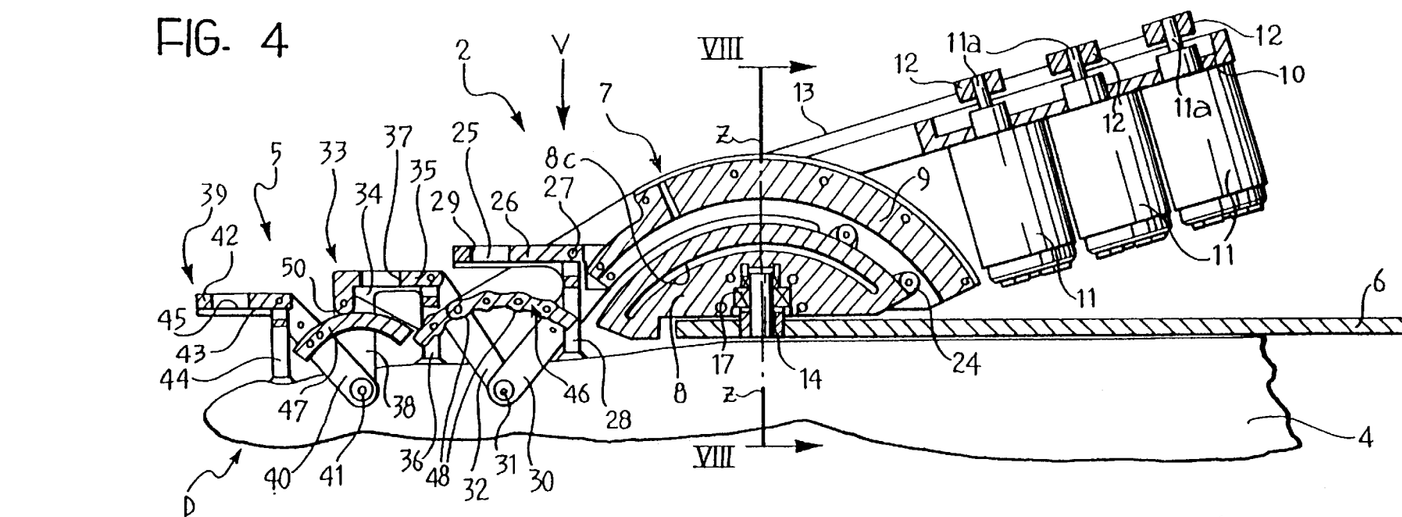
FIG. 4 is a longitudinal section, on an enlarged scale, of a portion of the device of FIG. 1 relating to one finger of the operator.
Figure 5:
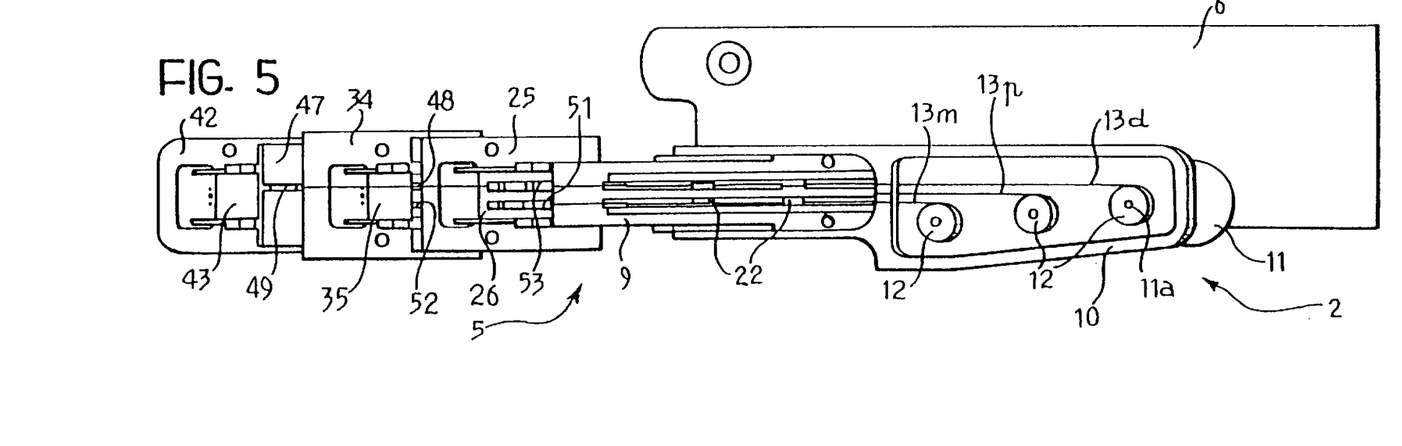
FIG. 5 is plan view of the portion of the device of FIG. 4, in the direction of the arrow IV.

With reference to FIGS. 3, 4, 5, the exoskeleton hand 2 includes one or more exoskeletons fingers 5 connected to a dorsal plate 6 which is designed to cover the back of the user's-hand M at least in part. A circular guide, generally indicated 7 and including a track 8 and a carriage 9 is connected for rotation about an axis Z—Z which is coincident with the abduction-adduction axis I of the finger to the dorsal plate 6. A platform 10 is rigidly fixed to the track 8, extending in the direction of the back of the hand M and supporting three electric motors 11 of known type, each complete with gear unit. Keyed on its shaft 11a, each motor 11 carries a drive pulley 12 to which is fixed one end of a respective traction cable, generally indicated 13, which is partly wound onto the drive pulley 12. In particular, the three traction cables 13 associated, in a manner better illustrated hereinafter, with the distal, medial and proximal phalanges respectively are indicated 13d, 13m and 13p.

Figure 8:
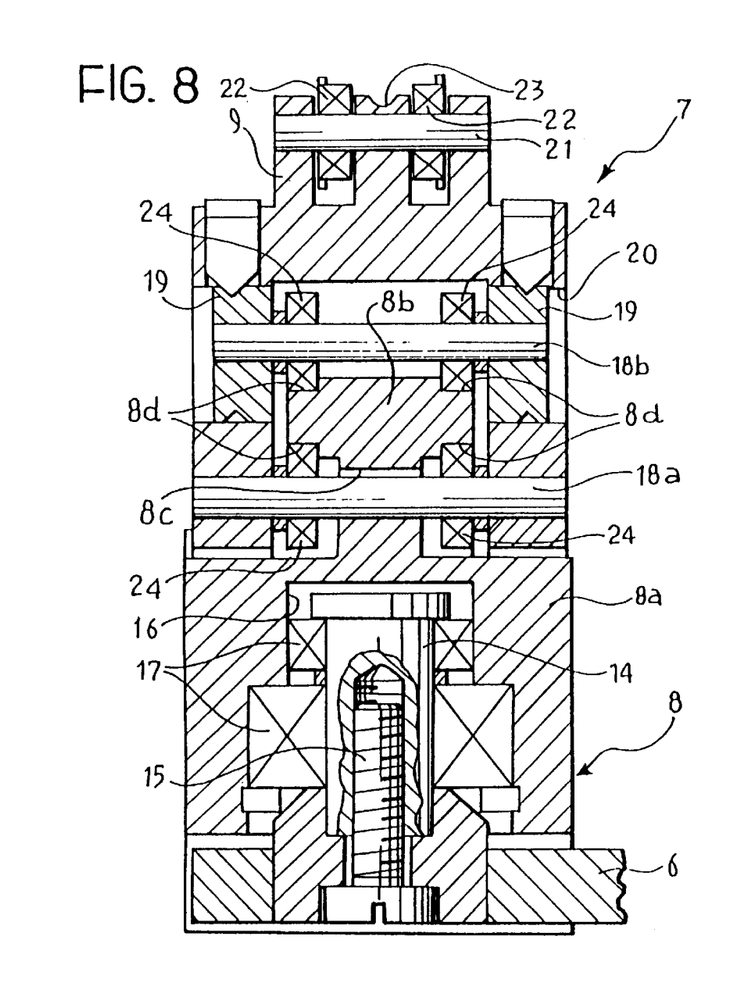
FIG. 8 is a section, on an enlarged scale, taken on the line VIII—VIII of FIG. 4.

As shown in FIG. 8, the track 8 of the circular guide 7 is pivoted about the axis Z—Z on the dorsal plate 6 by means of a pin 14, fixed by a screw 15 to the dorsal plate 6 and housed in a cylindrical cavity 16 in the track 8 with interposed ball, roller or needle bearings 17.

Seen in side view, the track 8 is shaped substantially as an arc of a circle and includes, as seen in the cross section of FIG. 8, a base portion 8a with a generally T-section appendage 8b, extending radially therefrom. The stem of the T-section appendage 8b has a slot 8c which is arcuate in side view (see FIG. 4), while the upper and lower surfaces of the two arms of the T-section form tracks 8d on which the outer rings of the bearings 24 roll. The bearings 24 act as wheels and are supported for rotation by a lower shaft 18a and an upper shaft 18b carried by the carriage 9 of the circular guide 7. The bearing pressure of the paths of bearings 24 on the tracks 8d can be adjusted by the rotation of an adjustment drum 19 rotatable in circular apertures 20 in the carriage 9, which supports the upper shaft 18b eccentrically.

On the outermost portion of the carriage 9, the lateral outline of which is also an arc, are mounted transverse pins 21 on which are mounted pairs of idler pulleys 22, which are symmetrical about a median transverse plane of the carriage 9. A substantially semi-cylindrical groove 23 is formed in the top of the carriage 9, along this median transverse plane, for housing and guiding one of the traction cables 13, as explained more fully hereinafter.

Figure 9:
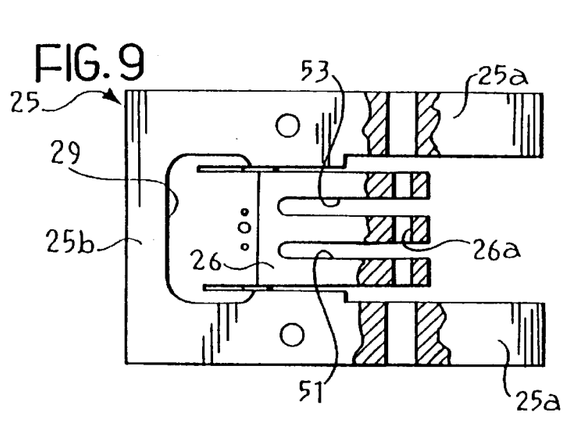
FIG. 9 is a partially sectioned plan view, on an enlarged scale, of a detail of FIG. 1, in the direction of the arrow IX.

A bracket 25, shown in detail in plan view in FIG. 9, is rigidly fixed to the front end of the carriage 9, as shown in FIGS. 4 and 5, for example by broaching. As seen in FIG. 9, the bracket 25 includes a substantially U-shaped main structure with two side arms 25a fixed to the carriage 9 and an end cross-member 25b from which extends, in the direction of the trolley 9 and within the arms 25a of the bracket 25, a plate 26 for transmitting the movements of the proximal phalanx. A through-hole 26a is formed in the end of the plate 26 projecting into the U-structure of the bracket 25 and houses a pin 27 (see FIG. 4) pivotally supporting a compensating lever 28 connected, at its lower end, to the glove structure 4, substantially in a median region of the proximal phalanx F. In the portion of the bracket 25 common to the end cross-member 25b and the plate 26 is a cavity 29 which, by reducing the thickness of the bracket 25 and of the plate 26 enables flexural deformations of the plate 26 relative to the bracket 25 to be concentrated in the bottom of the cavity 29 where electrical strain gauges are arranged (not shown in the drawing). The strain gauges are therefore able to detect deformations in the bottom of the cavity 29, which indicate the degree of flexure of the plate 26 relative to the bracket 25, and transmit this information in the form of electrical signals to a processing system, measurements being effected by a known system, such as for example a Wheatstone bridge.

Two articulation limbs 30, integral with the bracket, extend from the ends of the arms 25a of the bracket 25 which are fixed to the carriage 9 and two articulation limbs 32 are pivotally fixed by respective pins 31 to the ends of the limbs 30 opposite the carriage 9. The articulation limbs 32 form part of a medial exoskeleton structure, generally indicated 33, associated with the medial phalanx F of the finger D. The articulation limbs 32 extend to form a substantially U-shaped bracket 34, similar to the bracket 25, from which extends a plate 35 which is articulated at its other end to a compensating lever 36 which is fixed to the medial phalanx of the finger D in a substantially median region. As described above with reference to the bracket 25, a cavity 37 is formed in the area where the bracket 34 is fixed to the plate 35, with electrical strain gauges (not shown) arranged therein for measuring the degree of flexure of the plate 35 relative to the bracket 34. An idle pulley 50 is also mounted on the front end, opposite the articulation limbs 32, of the bracket 34 of the medial exoskeleton structure 33.

On the far side from the articulation limbs 32, the bracket 34 extends to form two further articulation limbs 38 pivotally fixed, by pins 41 arranged at their ends, to two articulation limbs 40 forming part of a distal exoskeleton element, generally indicated 39. The distal exoskeleton element 39 includes a bracket 42, structurally the same as the brackets 25 and 34, fixed to a plate 43 to which is articulated a compensating lever 44, associated with an intermediate area of the distal phalanx F of the finger D. In the area where the plate 43 is joined to the bracket 42, a cavity 45, which is the same as the cavities 29 and 37, houses electrical measuring strain gauges (not shown).

A medial guide shell 46 and a distal guide shell 47 are also fixed to the medial exoskeleton structure 33 and the distal exoskeleton structure 39 respectively, these shells being substantially constituted by two hollow cylindrical portions with their axes coincident with the pivot axes of the pins 31 and 41. Spaced along its arc shape, the medial guide shell 46 carries a series of transverse pins with guide pulleys 48 idly mounted thereon. A peripheral groove 52, substantially the same as the groove 23 in the carriage 9, is formed in the outer cylindrical surface of the medial guide shell 46 (see FIG. 5). A similar peripheral groove 49 is formed in the distal guide shell 47.

The proximal traction cable 13p, one end of which is fixed to the pulley 12 of the intermediate motor 11, extends in the medial longitudinal plane of the carriage 9, at least partially engaging the upper groove 23 and is fixed to a front area of the aforesaid carriage 9.

The medial traction cable 13m, also fixed at one end to one of the pulleys 12 of the electric motors 11, extends parallel to the proximal traction cable 13p, at least partially engaging one of the two parallel series of idle pulleys 22 mounted on the trolley 9 and then extending in the direction of the medial guide shell 46 after passing through a longitudinal slot 51 in the plate 26 (see FIG. 9). The end of the medial traction cable 13m is fixed to the front portion of the medial guide shell 46 and engages, at least partially, the peripheral groove 52 formed in the aforesaid medial shell 46.

The distal traction cable 13d, fixed to one of the pulleys 12 like the traction cables 13p and 13m, extends parallel to the other two cables and at least partially engages the other series of idle pulleys 22 of the carriage 9. The distal traction cable 13d then passes through a second longitudinal slot 53, formed parallel to the slot 51 in the plate 26, and at least partially engages the series of idle pulleys 48 mounted on the medial guide shell 46. The distal traction cable 13d is then returned by the last front idle pulley of the medial guide shell 46 towards the idle pulley 50 mounted on the bracket 34 of the medial exoskeleton 33 and is finally fixed to the front end of the distal guide shell 47, at least partially engaging the peripheral groove 49 in the aforesaid distal shell 47.

From the above description of the cable transmission of the exoskeleton hand 2, it is clear that these cables act on the articulation joints so as to cause individual phalanxes to extend.

The exoskeleton hand 2 may be fitted with resilient elements acting on the articulation joints to provide a minimum tension on the traction cables 13 even when no force is to be exerted on the phalanxes of the operator.

The interface device according to the present invention is provided with means for measuring the relative flexion angular position of the proximal, medial and distal articulation groups, constituted respectively by the track 8 and the carriage 9, the articulation limbs 30 and 32, and the articulation limbs 38 and 40, as well as the angular abduction-adduction position relative to the proximal articulation group constituted by the track 8 and the dorsal plate 6. These means for measuring relative angular positions, being of known type, may be constituted for example by variable-resistance elements manufactured using conductive plastics technology. Advantageously, a track of conductive material could be arranged on one of the elements constituting each individual articulation joint, for example the guide shells 46, 47, and on the track 8 on which could slide a sliding contact carried by the other element constituting the articulation, for example the brackets 25, 34 or the carriage 9. In an alternative arrangement, conductive tracks and wipers could be provided to determine the relative angular position on the articulation limbs 30, 32 or 38, 40 at the articulation pins 31 and 41. In any case, these means for measuring relative angular positions are able to supply, in known manner, a signal indicating the position and/or a movement of the articulation joints of the exoskeleton 1 and thus of the articulations of the distal physiological unit of the operator.

Figure 10:
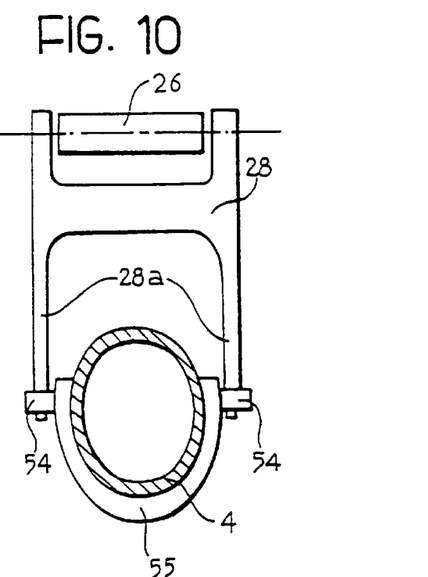
FIG. 10 is a section, on an enlarged scale, taken on the line X—X of FIG. 4.

FIG. 10 shows, by way of example, a possible arrangement for connecting the compensating levers to the glove structure 4. The compensating lever 28, illustrated in FIG. 10, which has a substantially H-shaped structure, is articulated at its top to the plate 26 and extends downwards with its lower arms 28a articulated, by pins 54, to a substantially semicylindrical support cradle 55 which embraces the palm portion of the finger phalanx and is fixed by adhesive or other retaining means to the glove structure 4.

Figure 2:
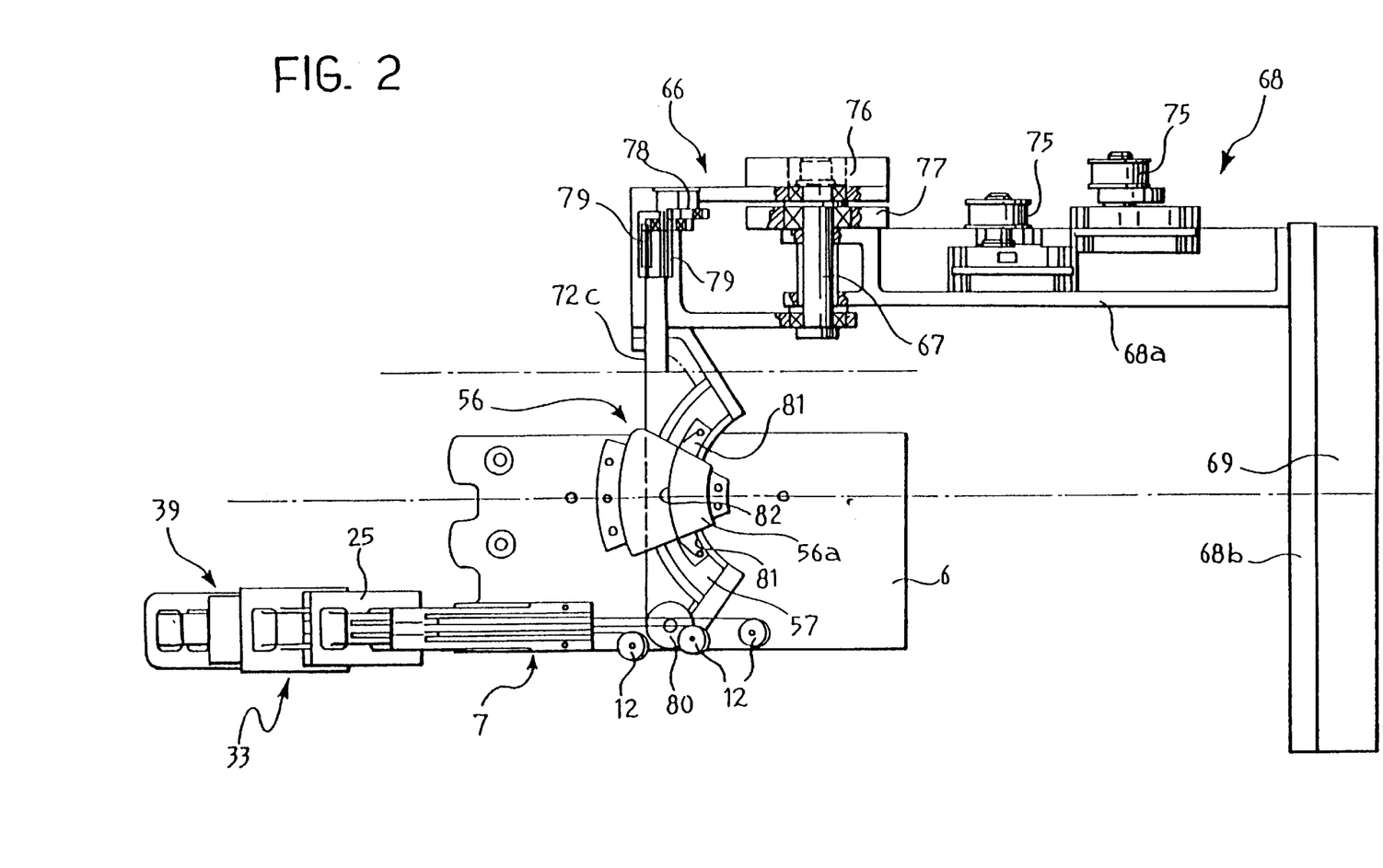
FIG. 2 is a plan view of the device of FIG. 1, in the direction of the arrow I.

With reference now to FIGS. 2 and 3, the dorsal plate 6, also fixed to the glove structure 4 by adhesive or other known retaining means, carries a fixed guide 56 including a flat upper portion 56a shaped as an annular sector with its axis substantially coincident with the abduction-adduction axis H of the wrist P and perpendicular to the dorsal plate 6. The flat portion 56a has two lateral appendages 81 and an arcuate projection 82 the function of which will be described hereinafter.

Two surfaces, a front surface 56b and a rear surface 56c, curved to form portions of a cylinder about the same axis as the flat portion 56a, project at a right angle from this flat portion 56a. Two perpendicular appendages extend from the front surface 56b and the rear surface 56c and are screwed to the dorsal plate 6. The fixed guide 56 embraces a semi-circular guide track 57 which can slide relative to the fixed guide 56 along a circular path about the aforesaid abduction-adduction axis H of the wrist P.

Figure 11:
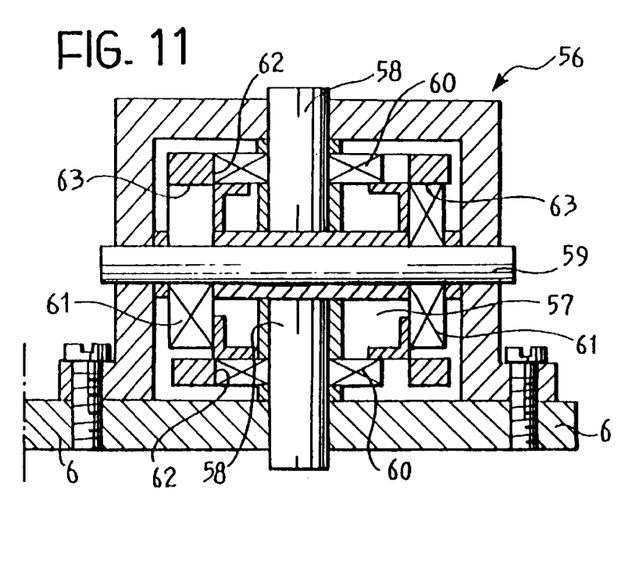
FIG. 11 is a schematic section of a detail of the present invention, taken on the line XI—XI of FIG. 3.

The details of the mounting of the guide track 57 in the fixed guide 56 are illustrated in FIG. 11. In particular, two mutually perpendicular pins 58 and 59 are mounted on the fixed guide 56 to support rotatably respective pairs of bearings 60, 61 acting as wheels, with their outer rings sliding on respective tracks 62, 63 formed by shoulders at the four corners of the guide track 57. The guide track 57 also has a pair of mutually perpendicular grooves 64, 65 (see FIG. 3) along which the pins 58, 59 pass during the sliding movement of the guide track 57 in the fixed guide 56.

A first wrist-articulation element 66 is rigidly fixed to one end of the guide track 57 and is pivotally fixed, by means of a pin 67 and respective rolling element bearings, to a second wrist-articulation element 68 which includes an elongate portion 68a, intended to run along the forearm of the operator, and a terminal ring 68b intended to surround the forearm of the operator near the elbow. The terminal ring 68b is rotatably fixed to and coaxial with a collar 69 intended to be fixed, by known means such as laces, ties and the like, to the forearm of the operator near the elbow. Alternatively, the collar 69 may form part of a full exoskeleton structure (not shown in the drawings) extending along the operator's whole arm.

The second wrist-articulation element 68 carries two electric motors 70 (see FIG. 1) complete with encoder and gear unit, onto which are keyed two drive pulleys 71 on which two traction cables 72 are fixed with no possibility of slipping, the ends of these cables being fixed to form two loops partially wound on respective pulleys 71. The two loops formed by the traction cables 72 each pass round an idle pulley 73, rotatable about an axis perpendicular to the axis of their respective pulley 71. The traction cables 72 then each pass through a respective tension measuring element 74, each including a pair of reaction pulleys 75, the shafts of which are mounted on a deformable support (not shown), for example a resilient strip, the deformation of which, due to the tension differential of the two lengths of cable 72 is easily detectable and measurable by means of electrical strain gauges mounted on the resilient support in a known configuration. One of the two cables, indicated 72a is closed by winding around a pulley 76 fixed to the first wrist-articulation element 66.

Figure 7:
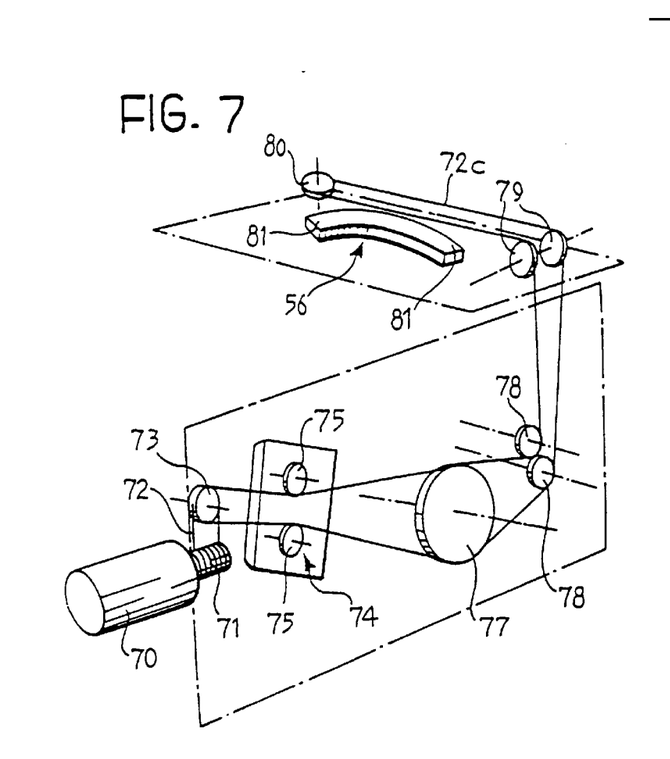
FIG. 7 illustrates in perspective the kinematic diagram of a detail of the device of the present invention.

The second traction cable, indicated 72b, is wound, in the schematic arrangement shown in FIG. 7, about a pulley 77 which is coaxial with the pulley 76 and mounted idly on the pin 67. The two lengths of the traction cable 72b are directed towards the dorsal plate 6 by two small transmission pulleys 78, the axes of rotation of which are parallel to the coaxial pulley 77, and are then taken through a right angle by two further pulleys 79 mounted on the first wrist-articulation element 66 so that they run alongside each other in a plane substantially parallel to the plane of the dorsal plate 6. One length of the traction cable 72b, indicated 72c in FIG. 2, is taken through 180° by a pulley 80 mounted idle on the end of the guide track 57 opposite the first wrist-articulation element 66. The two end lengths of the traction cable 72b are fixed to the fixed guide 56 adjacent the two appendages 81 which project laterally from the flat portion 56a of the fixed guide 56 and rest on the projection 82 on the upper portion 56a of the fixed guide 56 in such a way that alternating traction and release movement, in phase opposition, of the two end portions of the traction cable 72b connected to the appendages 81, is comparable to the driving motion, in one sense or the other, of a pulley with an axis of rotation coincident with the abduction-adduction axis H of the wrist P.

The rotational movement of the terminal ring 68b relative to the collar 69, along the pronate-supinate axis L of the hand M, may be controlled by means of a similar system (not shown in the drawings) including an electric motor, fixed to the ring 68b and controlling the movement of a traction cable wound around the collar 69. Alternatively, a direct traction control system may be provided, using, for example, a gear-transmission unit.

When the exoskeleton 1 is worn by an operator, all the devices for detecting the position of the articulations, as well as all the strain gauges and the electric motors, are connected by known interface means to the computer on which, for example, a programme is running for a virtual reality application. Information gathered by the position sensors enables the position and configuration of the hand represented by the processing system to be updated to conform with the actual configuration of the operator's hand.

By varying the position and the configuration of his own hand, the operator can thus interact with or grip and manipulate virtual objects generated in the same graphic environment.

During this interaction, the processing system is able to calculate the interaction forces on the basis of the physical characteristics of the hand and of the objects memorised in one of its data banks.

These force signals are sent to the input of the force-actuation servosystems which control the electric motors 11,70 accordingly so as to exert the desired forces on the phalanges and on the palm of the operator's hand.

The accuracy of the servosystem is ensured by the presence of force sensors (constituted by the brackets 25, 34, 42, by the plates 26, 35, 43 and, for the hand exoskeleton 2, by the strain gauges fixed to these latter and, for the wrist exoskeleton 3, by the elements 74) by means of which the processing system is always able to compare the interaction forces it has calculated with the forces effectively exerted and to correct the signals controlling the electric motors whenever necessary.

As is clear from the preceding description, the present invention provides an interface device with a rigid exoskeleton and set kinematics. During design, the position of the articulation axes of the various elements constituting the articulation joints of the exoskeleton are defined so as substantially to coincide with the physiological articulation axes of the hand and wrist of a particular operator, or of an operator of average anthropometric measurements. The control and application of a force feedback to the adduction-abduction articulation of the fingers D of a hand M can be integrated into the device described above simply by extending to the axis I of FIG. 6 the inventive concepts and manufacturing arrangements described heretofore. In any event, even when in order to reduce the complexity of the device it is not deemed necessary to provide a force feedback of this articulation of the operator's hand, the presence of the pin 14 means that the mobility of the finger is not limited since this pin enables the circular guide 7 to rotate freely about an axis perpendicular to the dorsal plate 6 and substantially coincident with the physiological adduction-abduction axis I of the finger D.

The use of the connecting compensating levers 28, 36, 44 between exoskeleton structures of the phalanges F and the glove structure 4 worn by the operator makes it possible to correct, within certain limits, any deviations of the articulation axes of the exoskeleton relative to the physiological articulation axes of the phalanges F of the operator's hand M, caused by differences in morphology and anthropometric measurements between the operator and the built-in design, meaning that different operators can use the same interface device at different times.

The adoption of the two series of pulleys 22 on the carriage 9 and of the pulleys 48 on the medial exoskeleton structure 33 enables sliding caused by the traction cables 13m, 13d on the mechanical parts of the interface device to be reduced to the minimum, independently of the configuration of the phalanges F of the operator's fingers D. For example, in a fully extended configuration of the operator's finger D, the traction cables 13m, 13d engage only a reduced number of pulleys 22, 48, while in a configuration in which the proximal and/or medial phalanges are flexed, the number of pulleys engaged will be greater but this will not lead to any rubbing between the cables and any portion of the interface device, with the only friction being the rotational friction of the pulleys 22, 48.

In addition, the use of the arcuate guide shells 46, 47 and of the carriage 9 and the projection 82 on the fixed guide 56 having axes coincident with the articulation axes of the exoskeleton, and the arrangement of the return pulleys of the traction cables 13, 72 along circumferences having axes coincident with the articulation axes of the exoskeleton, makes it possible for the individual contributions of the tensions of the traction cables 13 to be unvarying with the fingers configuration when the articulation joints are in equilibrium.

This permits the maximum simplification of the calculation of the signals controlling the electric motors in dependence on the forces to be exerted, which translates into a faster response by the force-actuation servosystem.

Naturally, the principle of the invention remaining unchanged, embodiments and manufacturing details may be varied widely from those described and illustrated, without departing thereby from the scope of the present invention.

What is claimed is:

1. A device operable to provide a force feedback to a physiological unit, articulated about at least one physiological axis, which includes generator means (11, 12, 70, 71) for generating a force simulating an interaction between said physiological unit and a virtual object, and transmission means (8, 13, 25, 33, 39, 56, 66, 68, 69, 72) for transmitting said force to the physiological unit, wherein said device comprises support means for supporting said transmission means on said physiological unit and wherein the transmission means include at least two kinematic elements, articulated about at least one articulation axis which is arranged coincident with or immediately adjacent said physiological axis when said transmission means is supported on said physiological unit.

2. A device according to claim 1, wherein said device includes position sensor means operable to detect the configuration of the physiological unit.

3. A device according to claim 1, wherein said device includes force sensor means operable to detect the force applied to the physiological unit.

4. A device according to claim 1, wherein said physiological unit is a distal physiological unit including an extremity (M) of a limb, said extremity being connected by a wrist (P) to a respective distal section (A) of said limb and including at least one finger (D) constituted by phalanges (F), said kinematic elements (8, 25, 33, 39, 56, 66, 68, 69) being articulated about axes arranged coincident with or in close proximity to physiological axes chosen from the group constituted by:

flexion-extension axes (B, C, E) of the phalanges (F), adduction-abduction axis (I) of said at least one finger (D), pronation-supination axis (L) of said distal section (A) of the limb, flexion-extension axis (G) of said wrist (P), and adduction-abduction axis (H) of said wrist (P).

5. A device according to claim 4, wherein said support means comprises an exoskeleton structure (1) including said articulated kinematic elements and made up of an exoskeleton hand portion (2) and an exoskeleton wrist portion (3).

6. A device according to claim 5, wherein the exoskeleton structure (1) supports the generator means (11, 12, 70, 71) which include actuator means (11, 70) which are selectively operable to control said transmission means (8, 13, 25, 33, 39, 56, 66, 68, 69, 72).

7. A device according to claim 6, wherein the transmission means include inextensible traction means (13, 72) which respectively connect each of the actuator means (11, 70) with a corresponding kinematic element.

8. A device according to claim 7, wherein the inextensible means include traction cables (13, 72) wound at one end on pulley means (12, 71) rotatable by the actuator means (11, 70).

9. A device according to claim 7, wherein the inextensible means (13, 72) run at least partially over groups of idle pulleys (22, 48, 50, 73, 77, 78, 79, 80) mounted on the exoskeleton structure (1).

10. A device according to claim 5, wherein the means for measuring the force applied to the physiological unit include strain gauge units mounted on said exoskeleton structure (1).

11. A device according to claim 7, wherein said transmission means includes resilient means operable to ensure a minimum tension on the inextensible traction means (13, 72) when the device is in a zero operating condition with regard to any of the forces applied to the physiological unit.

12. A device according to claim 5, wherein the exoskeleton hand portion (2) includes a grove structure (4) for fitting on the extremity (M) of the said limb.

13. A process for supplying a force feedback to a physiological unit, articulated about at least one physiological axis, wherein said process includes the steps of:

prearranging a processing system in which to memorize the physical characteristics and the position data of at least one virtual object, prearranging an interface device for transmitting to the processing system position signals indicating the configuration of the physiological unit, in order to determine a virtual representation of the physiological unit, prearranging generator means for generating a force and transmission means for transmitting the generated force to the physiological unit, detecting an interaction between the virtual representation of the physiological unit and the virtual object to determine the generation of signals activating the force-generating means, said force, transmitted to the physiological unit by the transmission means, assuming at the point of application to the physiological unit a value independent of the configuration of the physiological unit itself.

14. A process according to claim 13, further comprising the step of providing force sensor means operable to transmit to the processing system signals indicating the force applied to the physiological unit, the processing system comparing the generator means activation signals with signals from the force sensor means so as to modify the activation signals in the event of registering a discordance between the signals which would indicate an incongruity between the simulated interaction force and the force feedback applied to the physiological unit.

15. A process according to claim 14, wherein said force sensor means are arranged coincident with or in close proximity to the points at which the force is applied to the physiological unit.

* * * * *